United States Patent
Vassilieff

(10) Patent No.: US 8,742,915 B2
(45) Date of Patent: Jun. 3, 2014

(54) METHOD AND UNIT FOR THE OPTIMIZED TRANSMISSION OF MEASUREMENT OF PARAMETERS OF VEHICLE TYRES

(75) Inventor: Youri Vassilieff, Toulouse (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 98 days.

(21) Appl. No.: 13/581,558

(22) PCT Filed: Mar. 22, 2011

(86) PCT No.: PCT/EP2011/001400
§ 371 (c)(1),
(2), (4) Date: Aug. 28, 2012

(87) PCT Pub. No.: WO2011/116925
PCT Pub. Date: Sep. 29, 2011

(65) Prior Publication Data
US 2012/0319832 A1   Dec. 20, 2012

(30) Foreign Application Priority Data
Mar. 24, 2010 (FR) ...................................... 10 01170

(51) Int. Cl.
*B60C 23/00* (2006.01)
(52) U.S. Cl.
USPC ........... 340/447; 340/442; 340/445; 340/448; 340/539.1; 340/539.19
(58) Field of Classification Search
USPC ......... 340/445, 448, 449, 539.1, 539.19, 446; 116/34 R; 73/146, 146.3, 146.4, 146.5, 73/146.8
See application file for complete search history.

(56) References Cited

U.S. PATENT DOCUMENTS

| | | | | |
|---|---|---|---|---|
| 5,335,540 A | * | 8/1994 | Bowler et al. | 73/146.5 |
| 5,710,539 A | * | 1/1998 | Iida | 340/444 |
| 5,825,286 A | * | 10/1998 | Coulthard | 340/447 |
| 6,259,360 B1 | * | 7/2001 | Takamura | 340/445 |
| 6,357,292 B1 | * | 3/2002 | Schultz et al. | 73/146.5 |

(Continued)

FOREIGN PATENT DOCUMENTS

DE   102 13 266 A1   10/2003
GB   2 406 947 A   4/2005

OTHER PUBLICATIONS

International Search Report, dated Apr. 28, 2011, from corresponding PCT application.

*Primary Examiner* — Hoi Lau
(74) *Attorney, Agent, or Firm* — Young & Thompson

(57) ABSTRACT

In a system for monitoring the pressure of the tires of a vehicle, it is proposed to compensate the raw data of the parameters of the tires only if the comparison of the successive raw data of at least one reference parameter exhibits a deviation, in absolute value, greater than a determined threshold of variation. In a TPMS monitoring system, each wheel unit includes sensors for measuring the parameters of pressure, temperature and acceleration, and elements of storage and autonomous power supply, in conjunction with a processor. The raw data provided by the sensors are stored, compensated and transmitted as finalized data by a radiofrequency emission circuit to a central unit. It is proposed that the wheel unit also includes, in a processing module, comparison elements, external to the processor, for comparing between successive raw data of one and the same parameter that are provided by the measurement sensors.

20 Claims, 2 Drawing Sheets

(56) References Cited

U.S. PATENT DOCUMENTS

Figure 1:
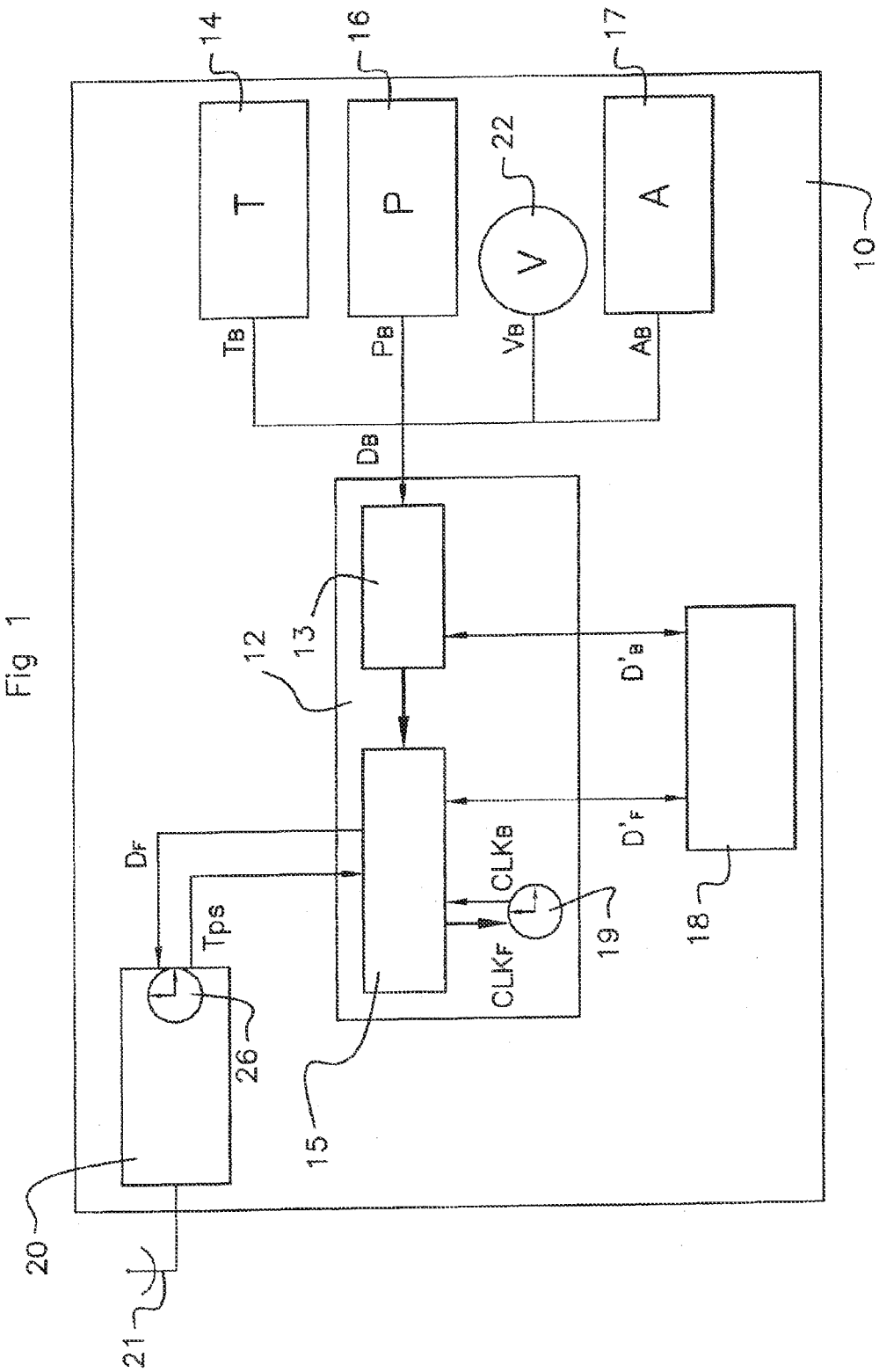

| | | | |
|---|---|---|---|
| 6,518,875 B2* | 2/2003 | DeZorzi | 340/442 |
| 6,630,885 B2* | 10/2003 | Hardman et al. | 340/505 |
| 7,040,154 B2* | 5/2006 | Shaw et al. | 73/146.5 |
| 7,119,670 B2* | 10/2006 | Hammerschmidt | 340/447 |
| 7,343,790 B2* | 3/2008 | Hammerschmidt | 73/146.3 |
| 7,367,227 B2* | 5/2008 | Stewart et al. | 73/146 |
| 7,511,609 B2* | 3/2009 | Hammerschmidt | 340/447 |
| 7,594,433 B2* | 9/2009 | Bondu | 73/146.5 |
| 7,873,449 B2* | 1/2011 | Bujak et al. | 701/33.7 |
| 8,085,142 B2* | 12/2011 | Kawase et al. | 340/447 |
| 2005/0057348 A1* | 3/2005 | Hammerschmidt | 340/445 |
| 2007/0013499 A1* | 1/2007 | Hammerschmidt | 340/442 |

* cited by examiner

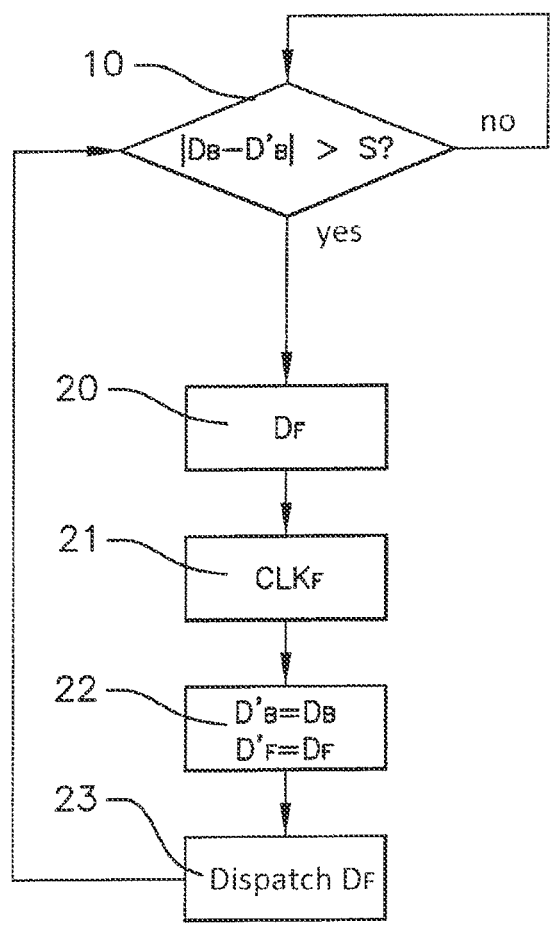

METHOD AND UNIT FOR THE OPTIMIZED TRANSMISSION OF MEASUREMENT OF PARAMETERS OF VEHICLE TYRES

The invention relates to a method and unit for optimized transmission of measurement of parameters of vehicle tires, in particular the pressure, and/or the acceleration and/or the temperature.

Tire parameter measurements are performed by sensors in onboard modules—called wheel units—of a system for monitoring the pressure of the tires, of the type known by the name TPMS (initials of "Tire Pressure Monitoring System").

In a TPMS system, each wheel unit comprises sensors for measuring the parameters of pressure, and/or temperature and/or acceleration, as well as means of storage and autonomous power supply, in general in the form of a battery, in conjunction with a processor for processing the data provided by the sensors according to a given time base. The internal time base regulates the timing of the tasks of these various elements constituting each wheel unit.

In particular, the time base periodically triggers the measurements of the parameters and their storage. The measured and stored values are transmitted by a radiofrequency (hereinafter RF) emission circuit to a central unit for display, for example on the dashboard of the vehicle, for an alarm triggering (in the case of detection of abnormal values) and optionally for a comparative analysis between the parameters of the four tires.

For error-free correlation of the stored measurements with the identification of the corresponding tires, precise timing of the transmission of the identifiers of the wheel units to the central unit is implemented. The corresponding signals are emitted with low intensity so as to reduce transmission costs. The transmission of these signals to the central unit is performed by the radiofrequency emission circuit at a precisely defined frequency (433.92 MHz in Europe with a strict tolerance of +/−50 kHz). This frequency is regulated by a precise clock, in general a quartz clock. It will be referred to as the clock of the emission circuit.

To reduce costs, the processor possesses another time base adjusted by a low-frequency or even very low-frequency oscillator circuit, less expensive than the quartz clock, called the LFO clock (initials of Low Frequency Oscillator). This LFO clock manages the frequency of the measurements of the parameters (temperature, pressure, acceleration, etc.). It will be referred to as the clock of the processor.

Unfortunately, this clock of the processor is temperature sensitive and drifts over time. This generates variations of periods of measurement and of emission of the parameters that are non-negligible, or indeed significant (the time base of the clock of the processor being decorrelated from the time base of the clock of the emission circuit), that is to say of possibly as much as 20 to 30%. Consequently, to avoid overly large reaction times, upon a variation of one of the parameters, a temporal precalibration of this clock of the processor is performed before it is put into service: the frequency of measurement of the parameters is by default increased in relation to the nominal value desired and/or dictated by legislation. This increase in the frequency of measurement of the parameters is expensive in terms of energy and time. Indeed each measurement requires a compensation (explained below), that is to say a calculation performed by the processor, which is energy consuming.

The raw data measured by the sensors (supply voltage, pressure, temperature, acceleration, etc.) are interdependent and must be corrected by a complex polynomial calculation of order three. The raw data thus corrected are transmitted, as finalized data, to the central unit. In general, the finalized data are calculated according to the following scheme:

the finalized datum of the supply voltage $V_F$ is dependent on the raw datum of the supply voltage $V_B$, that is to say: $V_F=f_1(V_B)$, the finalized datum of the temperature $T_F$ is dependent on the raw datum of the supply voltage $V_B$ and the raw datum of the temperature $T_B$, that is to say: $T_F=f_2(V_B, T_B)$, the finalized data of the pressure $P_F$ and of the acceleration $A_F$ are dependent on the raw data of the supply voltage $V_B$, the temperature $T_B$ and the pressure $P_B$, that is to say: $P_F=f_3(V_B, T_B, P_B)$ and $A_F=f_4(V_B, T_B, P_B)$.

Now, these numerical compensations are expensive in terms of processor calculation time, and therefore in terms of energy. The lifetime of the battery which energizes each wheel unit is thus substantially decreased, and it is therefore necessary to envisage batteries of larger capacity in order to retain the same lifetime. Moreover, the processor must then have a sufficient calculation capacity, thereby also requiring an investment in cost suited to this type of processor.

In order to increase the lifetime of the battery, it is known to identify several modes of operation of the vehicle, by measuring at regular frequency the tangential acceleration of the wheel unit. This tangential acceleration of the wheel unit (not to be confused with the acceleration of the vehicle) is indeed proportional to the speed of the vehicle. If the tangential acceleration is zero, then the vehicle is stationary in "parking" mode and the frequencies of measurement of the parameters and the frequencies of emission of the finalized data are reduced. This therefore allows a saving in the energy dedicated to the compensation calculations as well as the energy dedicated to the RF emission in this particular mode where enhanced monitoring of the parameters of the tire is not necessary.

If the value of the tangential acceleration increases above a threshold (for example above 5 g, with g=9.81 m/s$^2$), that is to say if the speed of the vehicle increases suddenly, it is known to then switch from the "parking" mode to an "accelerated emission" mode for a predetermined time where the frequency of measurement of the parameters and the frequency of emission of the finalized data is increased. This makes it possible to rapidly detect a tire anomaly as the vehicle starts to drive away. Once this predetermined time has elapsed and if the speed of the vehicle remains constant, that is to say if the tangential acceleration remains above this threshold (5 g), the processor then switches to a "driving" mode with measurement and emission frequencies specific to this mode. Switches to an "interim" mode are envisaged if the speed of the vehicle drops suddenly, for example if the vehicle is at traffic lights. In this "interim" mode, the frequencies of measurement of the parameters and of emission of the finalized data are high so as to rapidly detect a resumption of motion of the vehicle and to be able to rapidly detect any tire pressure anomaly. By adapting the frequency of measurement of the parameters as well as the frequency of emission of the finalized data according to the state which the vehicle is in (parking mode, sudden acceleration, deceleration or constant speed), needless consumption of the battery is thus avoided.

However this is not sufficient and these various compensations, whatever the mode of driving is performed on the raw data ($V_B$, $T_B$, $P_B$, $A_B$), consume a great deal of energy and require batteries of large capacities. This energy consumption is added to that induced by the increase in the measurement frequencies due to the drifting of the processor clock.

The invention is aimed at solving these problems of drifting, without additional cost while increasing the lifetime of the batteries.

The invention proposes a method of optimized transmission of finalized data of parameters of tires of a vehicle, said data being obtained on the basis of raw data of parameters measured by sensors of the wheel units of a system for monitoring the pressure of the tires to a central unit, mounted on the vehicle, by way of a radiofrequency circuit, said wheel units each comprising:

a processor, located in a processing module, for calculating the finalized data on the basis of the raw data, a memory so as to store the raw data and the finalized data, a clock of the processor, linked to the processor, possessing a time base for managing the frequency of the measurements of the raw data, a clock of the emission circuit possessing a time base and managing the frequency of emission by an emission circuit of the finalized data to the central unit, said method comprising the following steps:

step 1, verification in each wheel unit, by comparison means, situated in the processing module and linked to the processor and to the sensors, that the difference between a new raw datum of at least one reference parameter, provided at a given instant, and a raw datum of this same parameter, provided at an earlier instant and stored in the memory, is greater, in absolute value, than a predetermined threshold of variation, step 2, if the threshold of variation is crossed, calculation by the processor, step 3, storage in the memory of the new raw data and of the corresponding new finalized data, step 4, transmission of the finalized data to the central unit by way of the emission circuit.

Thus, the invention makes provision to refrain from compensating the measurements of the parameters when the raw measurements do not change substantially or evolve slowly in the course of time, a compensation of the measurements occurring only when it is detected that the raw data vary. The invention furthermore proposes, prior to step 3, a correction by the processor of the time base of the clock of the processor with the time base of the clock of the emission circuit, so as to obtain a more precise corrected time base. This makes it possible to remedy any drifting of the clock of the processor.

Advantageously, the invention proposes that the comparison between the raw data be performed by elementary logic situated in the comparison means external to the processor.

Thus, the processor is utilized only when significant environmental changes are detected by a preparatory processing for comparing the successive raw data. The invention thus makes it possible to reduce the data numerical processing part by defining a partition between a purely numerical processing and a preparatory processing carried out by elementary-logic components. The processor is therefore utilized less and its calculation speed is correspondingly increased. The appropriate processor thus requires less power and it is therefore chosen within a lower cost range. Moreover, the capacity of the batteries does not then need to be increased as much as before in order to retain the same lifetime.

According to a particular mode of the invention, the reference parameter is the temperature. According to a variant of this embodiment, the threshold of temperature variation is at least equal to 2° C.

In another embodiment of the invention, the reference parameter is the supply voltage. According to a variant of this embodiment, the threshold of voltage variation is at least equal to 100 mV.

Alternatively, in a third embodiment, the temperature and the supply voltage are two reference parameters taken into account cumulatively, to correct and store the new raw data.

The invention also relates to a wheel unit for implementing the method described hereinabove.

Other characteristics and advantages of the invention will become apparent on reading the description which follows and which pertains to a detailed exemplary embodiment, with reference to the appended figures which represent, respectively:

FIG. 1, a schematic view of a wheel unit of a TPMS system according to the invention, and FIG. 2, a logic diagram of an exemplary implementation of the method according to the invention.

FIG. 1 illustrates an exemplary wheel unit 10 in accordance with the invention, aimed to be mounted on the valve (not represented) of a vehicle tire. This wheel unit 10 comprises a module for processing data 12 in conjunction with various components: sensors of temperature "T" 14, of pressure "P" 16, of acceleration "A" (or accelerometer) 17, a memory 18, an RF data emission circuit 20 and a battery battery 22 which powers all these elements.

The processing module 12 comprises comparator means 13 coupled to a processor 15 as well as a low-frequency oscillator (LFO) timing circuit or clock 19 of the processor 15 which regulates the frequency of the measurements of the various sensors. The emission circuit 20 transmits, through an RF antenna 21, finalized data $D_F$ for pressure $P_F$, temperature $T_F$ and acceleration $A_F$ (originating from the processor 15 of the module 12) to a central unit (not represented).

The emission circuit 20 comprises a quartz clock or clock 26 of the emission circuit 20 which precisely regulates the frequency of emission of the finalized data $D_F$ as well as the identifier of the tire concerned. The frequency of the clock 26 of the emission circuit 20 is here 13 MHz. The emission is of low intensity so as to limit energy consumption and extend the lifetime of the battery 22.

The comparator means 13 consist here of dedicated electronic circuits external to the processor 15. Alternatively, these means may be electrical elementary-logic components. The comparator means 13 receive raw data $D'_B$ ($D'_B$ representing independently or in a grouped manner the temperature $T'_B$, or the pressure $P'_B$, or acceleration $A'_B$ or else the supply voltage $V'_B$ originating from the memory 18), as well as other raw data $D_B$ ($D_B$ representing independently or in a grouped manner the temperature $T_B$, or the pressure $P_B$, or the acceleration $A_B$ or else the supply voltage $V_B$) of these same parameters originating, respectively, from the sensors 14, 16 and 17 and from the battery 20. The raw data $D_B$ originating from the sensors are transmitted by activation of the clock 19 of the processor 15 according to a timing rate regulated by the time base defined by this oscillator circuit which constitutes the clock 19 of the processor 15. In the example, the frequency of the clock 19 of the processor 15 is 1 kHz. More precisely, the measurements performed by the sensors 14, 16 and 17 are digitized by appropriate converters at the level of the respective sensors into raw data, respectively $T_B$, $P_B$ and $A_B$. The battery 22 transmits the measurement of the raw voltage $V_B$ measured across its terminals by a Wheatstone bridge or by any other means, for example variable capacitors.

The method according to the invention is illustrated in FIG. 2. The method consists firstly in comparing, through the comparison means 13, each new raw datum $D_B$ of a reference parameter originating from a sensor 14, 16, 17 at a given instant (that is to say $T_B$, $P_B$, $A_B$, $V_B$) with the raw datum of this parameter at an earlier instant $D'_B$ (that is to say $T'_B$, $P'_B$, $A'_B$, $V'_B$) and stored in the memory 18 (step 10). If the difference between these two raw data is greater, in absolute value, than a determined threshold S, that is to say if $|D_B-D'_B|>S$ (step 10), then the processor 15 is utilized. It calculates the new finalized data $D_F$ for all the parameters, that is to say $T_F$, $P_F$, $A_F$ and $V_F$ (step 20). Then it corrects the time base of the clock 19 of the processor 15, that is to say $CLK_B$, which has drifted, by using the much more precise time base of the clock 26 of the emission circuit 20, that is to say Tps (step 21). The next raw data will be measured with the corrected time base $CLK_B$ of the clock 19 of the processor 15.

The new finalized data $D_F$ thus calculated and the corresponding raw data $D_B$ are then stored in the memory in place of the equivalent data of the earlier instant which were stored there, that is to say $D_B$ becomes $D'_B$ and $D_F$ becomes $D'_F$ (step 22). The processor 15 thereafter transmits the finalized data $D_F$ to the RF emission circuit 20, which will emit them according to the time base Tps of the clock 26 of the emission circuit 20 to the central unit of the vehicle (step 23).

It should be noted that according to the embodiment, it may be envisaged that the finalized data $D_F$ are not transmitted immediately by the wheel unit, but transmitted subsequently, for example on demand of the central unit or upon a change of operating mode of the vehicle. It is therefore preferable to store them in the memory 18 so that they are available for a subsequent use.

On the other hand, if the difference between the two raw data is smaller, in absolute value, than a determined threshold S, that is to say if $|D_B-D'_B|<S$ (step 10), then the processor 15 is not utilized, no compensation or calculation is performed on the raw data, and the comparison means 13 continue to compare each new raw datum received with that stored in the memory 18. Neither is the time base $CLK_B$ of the clock 19 of the processor 15 corrected.

It should be noted that the wheel unit can at any moment, upon request by the central unit for example, transmit the latest finalized data $D'_F$ stored in the memory 18. Since the raw data, during the latest comparison, have not changed relative to their respective threshold, these latest finalized data $D'_F$ are entirely representative of the state which the tire is in at the instant at which the central unit requests it.

In a particular embodiment of the invention, if the difference between the two raw data is smaller, in absolute value, than a determined threshold S, that is to say if $|D_B-D'_B|<S$ (step 10) during a predetermined time $t_{delta}$, that is to say if the tire has been under stable thermodynamic conditions for a certain time, the invention proposes to calculate the number of moles of air n present in the tire.

Indeed the legislation on tire monitoring is being widened increasingly not only to the monitoring of the pressure of the tire but also to the monitoring of the number of moles of air contained in the tire. By the ideal gas relation, PV=nRT, where:

n is the number of moles,
R is the ideal gas constant,
P and T are the finalized data for the pressure and temperature,
and V the known volume of the tire, it is possible to deduce therefrom the number of moles of air contained in the tire. This calculation is carried out by the processor 15. This calculation is possible only if the tire is under stable conditions, that is to say if the raw data ($T_B$, $P_B$, $A_B$, $V_B$) have not changed for a certain time. The invention making it possible to monitor this evolution of the raw data, when the comparison between successive raw data $D_B$ is not greater than a threshold S over a predetermined time $t_{delta}$, the processor 15 calculates the number of moles of air n, on the basis of the latest finalized data stored in the memory 18, that is to say $D'_F$, and transmits this information to the central unit. This predetermined time $t_{delta}$ is of course calibrated so as to be representative of the time necessary for the stabilization of the tire, so as to calculate the number of moles of air n.

In a variant of the invention, the temperature T is the reference parameter and a new raw temperature datum $T_B$ measured and provided by the sensor 14 at a given instant "t" is compared with the raw temperature $T'_B$ measured and provided at an earlier instant "t'" and stored in the memory 18. Selection consists thereafter in compensating the raw data $D_B$ and the time base $CLK_B$ of the clock 19 of the processor 15 only if the reference parameter, here $T_B$, exhibits a deviation between the instants "t" and "t'" that is greater, in absolute value, than a determined threshold of variation $S_t$, for example 2° C.

If the difference, calculated by the comparison means 13, between these two measurements is smaller, in absolute value, than this determined threshold $S_t$, that is to say if $|T_B-T'_B|<2°$ C., then the processor 15 is not utilized, and no compensation of the raw data is performed. Of course, it is possible, if this difference remains smaller than St for a predetermined time, to calculate the number of moles of air n, as described previously.

The useful energy for performing the compensations—in the example, polynomial calculations of order three—so as to calculate the finalized values $D_F$ of the raw data for temperature, voltage, pressure and acceleration on the basis of their raw values $D_B$, corresponds to several μC (microcoulombs) per parameter. The invention makes it possible for this compensation to be performed only under determined conditions and not systematically so as to reduce energy consumption: the invention limits the number of compensation calculations performed by the processor 15 by selecting the useful data to be compensated with the aid of comparison means 13 external to the processor 15 and comprising simple and inexpensive logic. This makes it possible to reduce the energy consumption and therefore to use batteries of lower capacities without decreasing their lifetime.

Moreover, when a variation of a parameter is detected, in this instance that of the temperature, the invention also proposes to correct the time base of the clock 19 of the processor 15, that is to say $CLK_B$, with the time base Tps of the clock 26 of the emission circuit 20 that the latter clock provides to the processor 15 so as to obtain a more precise corrected time base $CLK_F$ for the next measurements of the raw data $D_B$. This considerably reduces the drifting of the frequency of measurement of the parameters. This compensation is fast, simple, inexpensive in terms of energy and makes it possible to increase the precision in the desired reaction time of the tire pressure monitoring system. It is therefore possible to reduce the value of the temporal precalibration of this clock 19 of the processor 15 in relation to the prior art. The frequency of the measurements of the parameters being more precise and decreased in relation to the prior art, the consumption of the battery is correspondingly reduced.

The temperature is, in this example, the reference parameter. But another parameter, such as the supply voltage $V_B$ across the terminals of the battery 22, can also serve as reference parameter, alone or aggregated with the temperature $T_B$. For example thresholds $S_v$ and $S_t$, respectively of variation, in absolute value, of voltage $V_B$ of 100 mV and/or of temperature variation $T_B$ of 2° C., may be defined so as to trigger the compensation calculation in the processor 15.

The invention is not limited to the examples described or represented and can of course be applied during any mode of operation of the vehicle ("parking", "driving", "accelerated emission", "interim" or other). It is for example possible to envisage that the comparisons between two raw data of a reference parameter are performed between data which do or do not follow one another directly. Moreover, it is possible to calibrate the threshold of variation of at least one reference parameter as a function of various criteria such as the type of vehicle, the type of tire or simply as a function of the energy saving of the battery that it is desired to obtain.

The invention claimed is:

1. A method of optimized transmission of finalized data ($D_F$) to a central unit of parameters of tires of a vehicle, said data being obtained on the basis of raw data ($D_B$) of parameters measured by sensors (14, 16, 17) of the wheel units (10) of a system for monitoring the pressure of the tires by way of a radiofrequency circuit (20), said wheel units (10) each comprising:
 a processor (15), located in a processing module (12), for calculating the finalized data ($D_F$) on the basis of the raw data ($D_B$)
 a memory (18) so as to store the raw data ($D'_B$) and the finalized data ($D'_F$),
 a clock (19) of the processor (15), linked to the processor (15), possessing a time base ($CLK_B$) for managing the frequency of the measurements of the raw data ($D_B$),
 a clock (26) of the emission circuit (20) possessing a time base (Tps) and managing the frequency of emission by an emission circuit (20) of the finalized data ($D_F$) to the central unit,
 said method being characterized in that it comprises the following steps:
  step 1, verification in each wheel unit (10), by comparison means (13), situated in the processing module (12) and linked to the processor (15) and to the sensors (14, 16, 17), that the difference between a new raw datum ($D_B$) of at least one reference parameter, provided at a given instant, and a raw datum ($D'_B$) of this same parameter, provided at an earlier instant and stored in the memory (18), is greater, in absolute value, than a predetermined threshold of variation (S),
  step 2, if the threshold of variation is crossed, calculation by the processor (15) of the finalized data ($D_F$) of the parameters on the basis of the raw data ($D_B$),
  step 3, storage in the memory (18) of the new raw data ($D'_B$) and of the corresponding new finalized data ($D'_F$),
  step 4, transmission of the finalized data ($D_F$) to the central unit by way of the emission circuit (20).

2. The method of optimized transmission as claimed in claim 1, characterized in that said method furthermore comprises, prior to step 3, a correction by the processor (15) of the time base ($CLK_B$) of the clock (19) of the processor (15) with the time base (Tps) of the clock (26) of the emission circuit (20), so as to obtain a more precise corrected time base ($CLK_F$).

3. The method of optimized transmission as claimed in claim 1, characterized in that during step 1, if the threshold of variation is not crossed, then said method comprises the following steps:
 step 2, calculation by the processor (15) of the number of moles of air (n) contained in the tire on the basis of the latest finalized data ($D'_F$) stored in the memory (18),
 step 3, transmission of the number of moles of air (n) to the central unit by way of the emission circuit (20).

4. The method of optimized transmission as claimed in claim 1, characterized in that the comparison between the raw data ($D_B$) is performed by elementary logic situated in comparison means (13) external to the processor (15).

5. The method of optimized transmission as claimed in claim 1, in which the reference parameter is the temperature (T).

6. The method of optimized transmission as claimed in claim 5, in which the threshold of temperature variation ($S_t$) is at least equal, in absolute value, to 2° C.

7. The method of optimized transmission as claimed in claim 1, in which the reference parameter is the supply voltage (V).

8. The method of optimized transmission as claimed in claim 7, in which the threshold of voltage variation ($S_v$) is at least equal, in absolute value, to 100 mV.

9. The method of optimized transmission as claimed in claim 1, in which the temperature (T) and the supply voltage (V) are two reference parameters taken into account cumulatively, to correct and store the new raw data.

10. A wheel unit for implementing the method as claimed in claim 1, comprising:
 sensors for measuring the parameters of pressure (16), of temperature (14) and of acceleration (17), as well as
 means of autonomous power supply (22),
 a processor (15) for calculating the finalized data ($D_F$) on the basis of the raw data ($D_B$) provided by the sensors,
 a clock (19) of the processor (15) possessing a time base ($CLK_B$) which periodically triggers the measurements of the parameters and their storage,
 means (18) for storing the raw data ($D_B$) and the finalized data ($D_F$),
 a radiofrequency emission circuit (20) transmitting the finalized data ($D_F$) to a central unit at a frequency predetermined by a clock (26) of the emission circuit (20) possessing its own time base (Tps),
 said wheel unit being characterized in that it also comprises, in a processing module (12), comparison means (13), external to the processor (15), for comparing between successive raw data ($D_B$) of one and the same parameter.

11. The wheel unit as claimed in claim 9, in which the comparison means (13) take the form of elementary-logic components.

12. The method of optimized transmission as claimed in claim 2, characterized in that during step 1, if the threshold of variation is not crossed, then said method comprises the following steps:
 step 2, calculation by the processor (15) of the number of moles of air (n) contained in the tire on the basis of the latest finalized data ($D'_F$) stored in the memory (18),
 step 3, transmission of the number of moles of air (n) to the central unit by way of the emission circuit (20).

13. The method of optimized transmission as claimed in claim 2, characterized in that the comparison between the raw data ($D_B$) is performed by elementary logic situated in comparison means (13) external to the processor (15).

14. The method of optimized transmission as claimed in claim 2, in which the reference parameter is the temperature (T).

15. The method of optimized transmission as claimed in claim 2, in which the reference parameter is the supply voltage (V).

16. The method of optimized transmission as claimed in claim 2, in which the temperature (T) and the supply voltage (V) are two reference parameters taken into account cumulatively, to correct and store the new raw data.

17. The method of optimized transmission as claimed in claim 3, characterized in that the comparison between the raw data ($D_B$) is performed by elementary logic situated in comparison means (13) external to the processor (15).

18. The method of optimized transmission as claimed in claim 3, in which the reference parameter is the temperature (T).

19. The method of optimized transmission as claimed in claim 3, in which the reference parameter is the supply voltage (V).

20. The method of optimized transmission as claimed in claim 4, in which the reference parameter is the temperature (T).

* * * * *